United States Patent
Al-Qaq et al.

(10) Patent No.: US 11,251,880 B2
(45) Date of Patent: Feb. 15, 2022

(54) CA POWER MEASUREMENT

(71) Applicant: Futurewei Technologies, Inc., Plano, TX (US)

(72) Inventors: Wael Al-Qaq, Oak Ridge, NC (US); Hong Jiang, Kernersville, NC (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 16/237,578

(22) Filed: Dec. 31, 2018

(65) Prior Publication Data

US 2020/0028597 A1 Jan. 23, 2020

Related U.S. Application Data

(60) Provisional application No. 62/700,713, filed on Jul. 19, 2018.

(51) Int. Cl.
*H04L 12/26* (2006.01)
*H04B 17/10* (2015.01)
*H04B 1/40* (2015.01)

(52) U.S. Cl.
CPC ............ *H04B 17/102* (2015.01); *H04B 1/40* (2013.01)

(58) Field of Classification Search
None
See application file for complete search history.

(56) References Cited

U.S. PATENT DOCUMENTS

| | | |
|---|---|---|
| 2013/0114556 A1 | 5/2013 | Yang et al. |
| 2013/0155847 A1 | 6/2013 | Li et al. |
| 2015/0257165 A1* | 9/2015 | Gale .............. H04W 72/0453 370/329 |
| 2016/0056987 A1 | 2/2016 | Choi et al. |
| 2017/0141807 A1 | 5/2017 | Chen et al. |

FOREIGN PATENT DOCUMENTS

| | | |
|---|---|---|
| CN | 104604146 A | 5/2015 |
| CN | 106411351 A | 2/2017 |
| WO | 2012015216 A2 | 2/2012 |
| WO | 2013177567 A1 | 11/2013 |
| WO | 2015047951 A2 | 4/2015 |

OTHER PUBLICATIONS

International Search Report dated Sep. 30, 2019, in PCT Patent Application No. PCT/CN2019/096599, 9 pages.
Office Action dated Jun. 29, 2021, Chinese Application No. 201980045629.9.

* cited by examiner

*Primary Examiner* — Willie J Daniel, Jr.
(74) *Attorney, Agent, or Firm* — Vierra Magen Marcus LLP

(57) ABSTRACT

A system and method for transmitting and for detecting a transmission power level of a carrier of aggregated carrier signals is configured to generate a plurality of carrier signals as a carrier aggregated signal and to generate an outgoing radio frequency (RF) signal based on the carrier aggregated signal and to produce a feedback signal based the outgoing RF signal. The system process the feedback signal by down converting a first carrier signal within the feedback signal from RF, canceling a down converted harmonically-related signal or an ADC Fs related signal of a second carrier of the carrier aggregated signal and producing a signal representative of the output power of the first carrier of the carrier aggregated signal within the feedback signal.

12 Claims, 10 Drawing Sheets

CA POWER MEASUREMENT

TECHNICAL FIELD

The present disclosure relates generally to a system and method for wireless communications and, in particular embodiments, to detecting and managing transmission power levels for carrier aggregated output signals.

BACKGROUND

A mobile telecommunication device such as a user equipment (UE) or a base station may use carrier aggregation to increase data transmission rates. The network through which the communications occur are part of a large group of cellular base stations and UEs. At times, various communications may interfere with other communications by creating interference from signal power and frequency conflicts. As such, it is often desirable to control outgoing power levels. In the case of a carrier aggregated signal, however, a typical control scheme includes controlling the outgoing power level for each of the carriers. To do this, however, it is often necessary to get an accurate outgoing power transmission level for each of the carriers. In some devices, a feedback signal is converted to a digital form for evaluation of the power level of each carrier. Unfortunately, however, in a multiple carrier embodiment, one carrier transmission may affect a power reading of another carrier. As such, erroneous power level readings for a given carrier affects the operation and control of the associated outgoing transmission power level. It is desirable, therefore, to improve the accuracy of the measurements for the individual carriers of an outgoing carrier aggregated transmission in a way that reduces circuitry.

SUMMARY

In accordance with an embodiment of the present disclosure, an apparatus for transmitting and receiving wireless communication signals is disclosed in which a measurement receiver for determining transmission power levels of individual carriers of outgoing carrier aggregated signals further includes an input for receiving a feedback signal based on a power amplified outgoing RF signal produced by transceiver circuitry and analog front end circuitry for down converting a first carrier signal within the feedback signal from RF to one of intermediate frequency or baseband frequency. The receiver further includes signal cancellation circuitry for aligning a down converted and harmonically-related second carrier signal with the second carrier signal and for substantially canceling the down converted harmonically-related second carrier of the carrier aggregated signal.

In accordance with an embodiment of the present disclosure, a measurement receiver for determining transmission power levels of individual carriers of outgoing carrier aggregated signals includes an input for receiving a feedback signal based on a power amplified outgoing RF signal produced by transceiver circuitry. The receiver further includes analog front end circuitry for down converting a first carrier signal within the feedback signal from RF to one of intermediate frequency or baseband frequency and signal cancellation circuitry for aligning a down converted and harmonically-related second carrier signal with a digital representation of the second carrier signal and for substantially canceling the down converted harmonically-related second carrier of the carrier aggregated signal In accordance with an embodiment of the present disclosure, a method for transmitting and detecting a transmission power level of a carrier of aggregated carrier signals includes generating a plurality of carrier signals as a carrier aggregated signal and generating an outgoing radio frequency (RF) signal based on the carrier aggregated signal. The method further includes producing a feedback signal based the outgoing RF signal and processing the feedback signal by down converting a first carrier signal within the feedback signal from RF, canceling a down converted harmonically-related signal of second carrier of the carrier aggregated signal and by producing a signal representative of the output power of the first carrier of the carrier aggregated signal within the feedback signal.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure, manufacture and use of the presently preferred embodiments are discussed in detail below. It should be appreciated, however, that the present disclosure provides many applicable novel concepts that can be embodied in a wide variety of specific contexts. The specific embodiments discussed are merely illustrative of specific ways to make and use the embodiments and do not limit the scope of the disclosure.

For Long Term Evolution (LTE) and newer radio technologies such as New Radio (NR), inter-band carrier aggregation (CA), carrier aggregated signals may have frequency relationships that interfere with each other, especially when being down converted for measurement. For example, two transmit channel frequencies can have a local oscillation (LO) harmonic relationship or can have a separation on the order of the ADC clock sampling rate. In either case, frequencies of one of the channels of one of the aggregated carriers may be undesirably down converted with a channel within the desired carrier. In one example, two carriers may have channels with a 3LO relationship. If the two bands share the same antenna coupler and measurement receiver (MRx), and if the MRx mixers are driven by a square LO to down convert one of the carriers (containing all odd order LO harmonics as is typically the case), then the other carrier signal can end up fully or partially down-converted on top of the desired carrier signal seriously degrading the desired carrier signal to noise ratio (SNR).

Another example is inter-band CA involving Band 1 and Band 3 (CA_1_3). In this case, two channels from Band 1 and Band 3 can have a frequency separation on the order of the ADC sampling rate (e.g. if ADC sampling rate=122.88 MHz). In this case, ADC aliasing can cause the potentially higher power (undesired) signal to fully or partially be on top of the desired signal after down conversion causing serious degradation to the SNR of the desired signal. The present embodiments of the disclosure address these situations in a way that is efficient in terms of IC real estate and efficiency.

Figure 1:
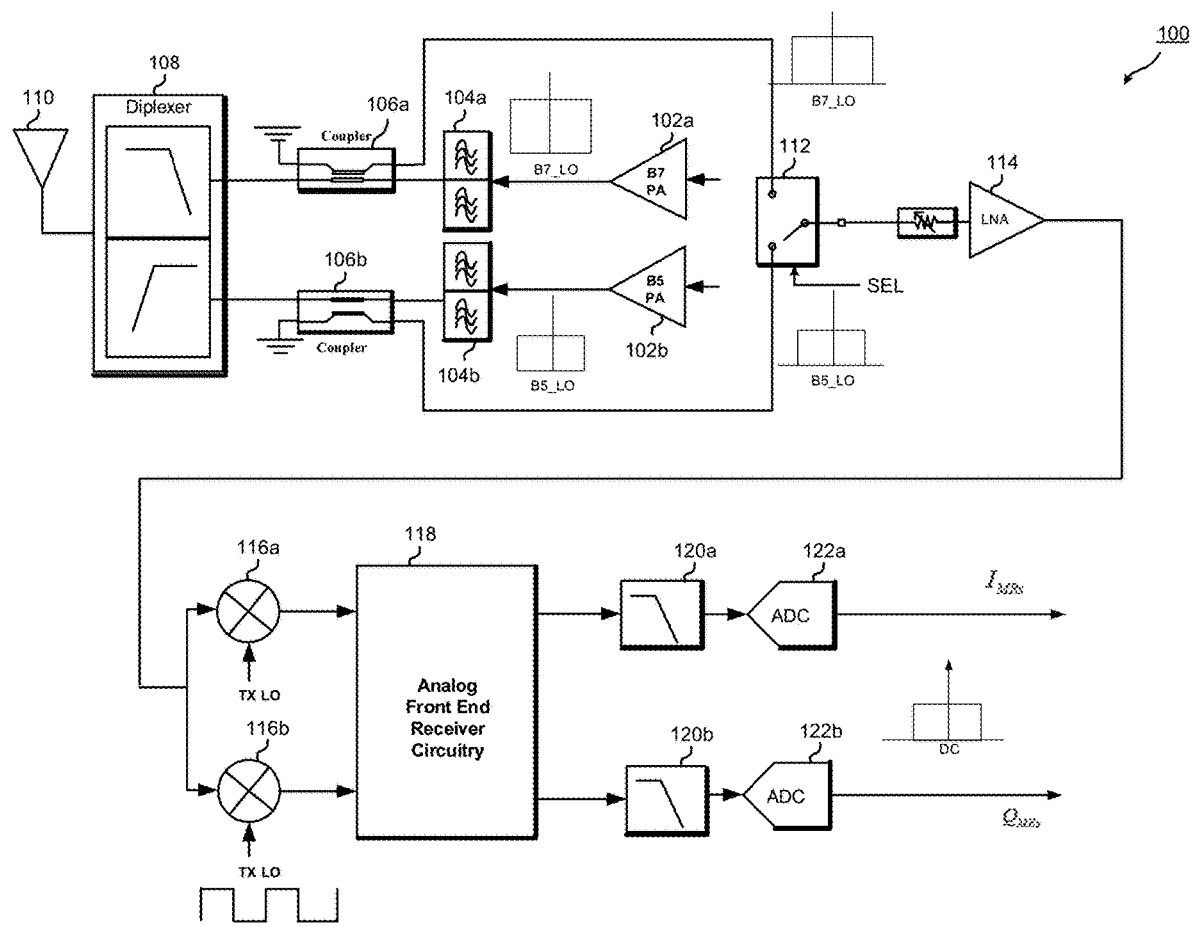
FIG. 1 is a prior art figure illustrating a functional block diagram of a measurement receiver connected to two power amplifiers that jointly produce an outgoing carrier aggregated signal.

FIG. 1 is a prior art figure illustrating a functional block diagram of a measurement receiver connected to two power amplifiers that jointly produce an outgoing carrier aggregated signal. Generally, FIG. 1 illustrates one possible front-end circuit to help overcome the harmonic relationship problem described above. As may be seen, a system too includes two power amplifiers 102a, 102b that each produce an outgoing carrier based on two LOs of B5 and B7. The outgoing power amplified outputs of amplifiers 102a, 102b are then produced to duplexers 104a, 104b, respectively and are forwarded to a diplexer 108 for transmission as a CA signal from antenna 110. Duplexers 104a, 104b operate as filters and, in an alternative embodiment, be replaced by filters. Two couplers 106a, 106b are disposed to pass the outgoing filter outputs of filters 1o4a, 104b to diplexer 108. Couplers 106a, 106b further each produce a feedback signal to a switch 112 that selectively produces a feedback signal of the feedback signals produced by couplers 106a, 106b to a low noise amplifier 114 that produces an amplified feedback signal to the MRx for processing.

To continue the analysis of the system of FIG. 1, the MRx comprises, in sequential order, I and Q mixers 116 that down convert the selected feedback signal to produce down converted feedback signals to analog front end receive circuitry 118. The MRx further includes circuitry for selecting and producing an LO to the mixers 116 that correspond to the desired bandwidth (carrier) that is to be down converted for measurement in one embodiment. Alternatively, mixers 116 include mixing circuitry for down converting two different frequencies. For this embodiment, the desired downconverted feedback signal is selected from the outputs of the mixing circuitry. The analog front end circuitry 118 then produces down converted ingoing feedback I and Q signals to filters 120a, 120b that produces ingoing filtered I and Q signals to ADCs 122a, 122b which then produce ingoing digital I and Q components of the feedback signal to hardware for processing.

One advantage of the system of prior art FIG. 1 is that a clean feedback signal that does not have the down converted components of another carrier is produced to the MRx for measurement because separate couplers are used for each band and an external switch is then used to select between two carrier signals (B5 or B7 in FIG. 1).

A disadvantage of a system such as that shown in FIG. 1, however, is the cost in additional hardware (two couplers and at least one switch are needed) as well as board space in relation to the present disclosure in which only one coupler is needed.

Another approach to avoid the interference from channels of other carrier frequency bands is to utilize a higher order MRx LPF or ADC clock sampling rate to provide higher rejection of aliasing effects. This approach however, typically may result in an increase in product area/cost and power consumption.

Figure 2A:
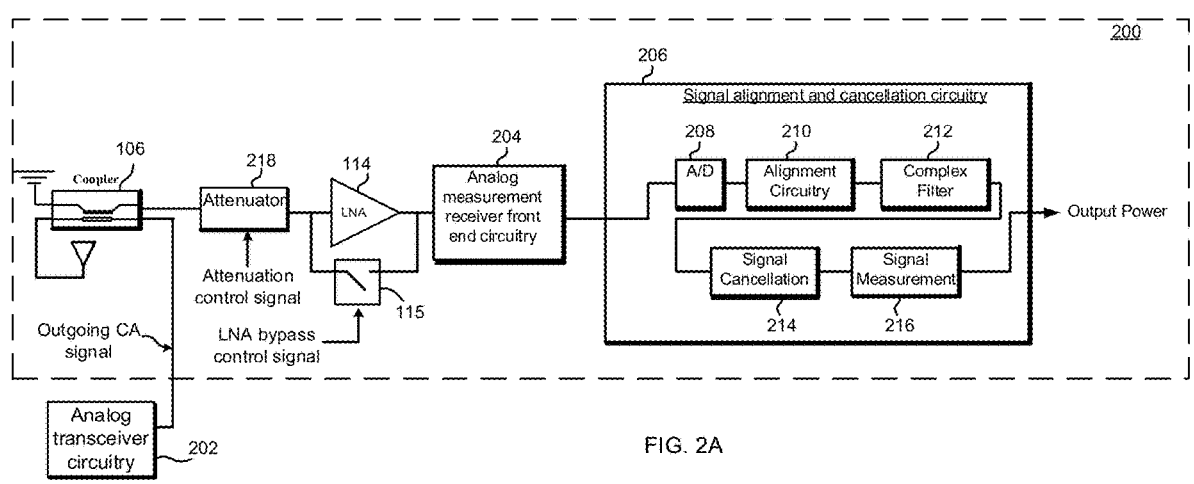
FIG. 2A is a functional block diagram of a measurement receiver according to one embodiment of the disclosure.

FIG. 2A is a functional block diagram of a measurement receiver 200 according to one embodiment of the disclosure. A coupler 106 is communicatively coupled to a transmission line carrying an outgoing power amplified CA signal. Coupler 106 is configured to produce a feedback signal that is based upon the outgoing power amplified CA signal for subsequent measurement. In particular, in the described embodiment, coupler 106 produces the feedback signal to a low noise amplifier (LNA) 114 by way of an attenuator 218, wherein the LNA amplifies and filters the feedback signal to produce an amplified feedback signal to selector circuitry 204. Attenuator 218 is there to attenuate the feedback signals produced by the coupler in those situations in which the Tx signal is a high power signal and needs to be attenuated prior to processing.

Selector circuitry 204 is configured to produce a down converted baseband or intermediate frequency analog feedback signal to analog-to-digital conversion and digital front-end processing circuitry 206. Selector circuitry 204 may include any variation of known analog front end circuit designs including various combinations of filters, amplifiers, etc. Analog-to-digital conversion and digital front-end processing circuitry 206 includes an analog-to-digital (A/D) converter 208 that is coupled to receive the down converted analog feedback signal and is further coupled to alignment circuitry 210. Alignment circuitry 210 is coupled to a complex filter 212 which is coupled to signal cancellation circuitry 214 which is also coupled to signal measurement circuitry 216. Signal measurement circuitry 216 then produces an output power measurement for a carrier or channel.

In operation, selector circuitry 204 receives the feedback signal from LNA 114 and down converts the signal to baseband or intermediate frequency based upon a local oscillation frequency that is produced to mixers that mix ingoing In Phase (I) and Quadrature Phase (Q) signals with the local oscillation. The frequency of the LO will cause the desired channel/carrier signals to be down converted to a desired frequency. Generally, other frequency bands that are down converted are down converted to different frequencies which may then be filtered to produce only the desired signals. One issue with this approach, however, is that harmonics of signals having a certain frequency separation (e.g., a multiple of the channel frequency) may also be down converted and then not filtered by the down stream filters of the selector circuitry 204. Accordingly, the down converted and filtered feedback signal (I and Q signals) are then produced to A/D converter 208 (while not shown here, should be understood to included two converters, one for the I path signals and one for the Q path signals).

A digital representation of the feedback signals are produced to alignment circuitry 210 that aligns digital representations of harmonically related down converted signals with the desired down converted signals. The aligned signals are then produced to complex filter 212 that applies weights in an iterative process to determine a set of weights that best cancels the harmonically related down converted signals which then leads to said cancellation by signal cancellation circuitry 214. The weights are based upon knowledge of the outgoing signal that is not being selected and processed for measurement. The resulting output of signal cancellation circuitry 214 is a digital representation of the channel/carrier whose power output is desirably measured and is produced to signal measurement circuitry 216 which, in turn, produces an indication of the output power level of the channel/carrier.

Figure 2B:
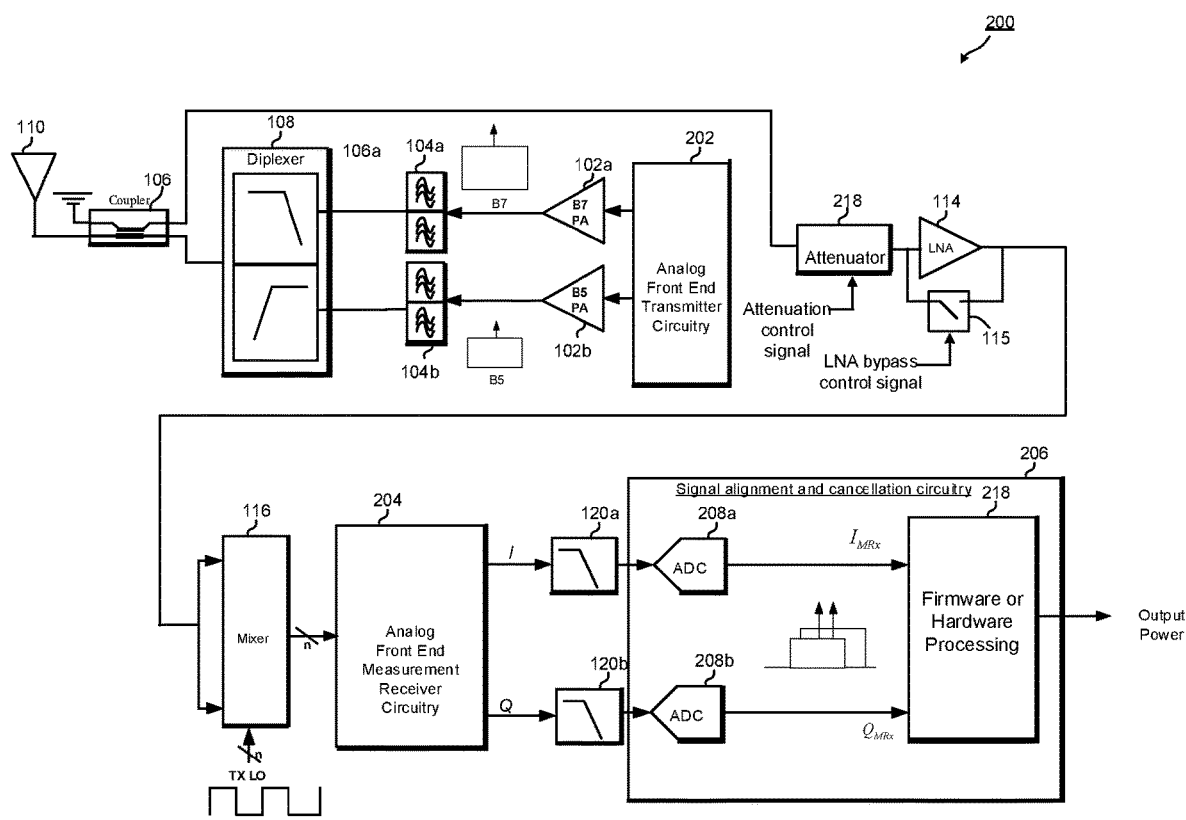
FIG. 2B is a functional block diagram of a measurement receiver connected to two power amplifiers that jointly produce an outgoing carrier aggregated signal according to one embodiment of the disclosure.

FIG. 2B is a functional block diagram of a measurement receiver connected to two power amplifiers that jointly produce an outgoing carrier aggregated signal according to one embodiment of the disclosure. Generally, FIG. 2B illustrates one possible front-end circuit to help overcome the harmonic relationship problem described above and provides more details about one implementation of the functional block diagram of FIG. 2A.

As may be seen, a system 100 includes two power amplifiers 102a, 102b that each produce an outgoing carrier based on two Los (e.g., LO$_1$ and LO$_2$) of B5 and B7 based on two outgoing RF signals (B5 and B7) produced by analog front end transmitter circuitry 202. The outgoing power amplified outputs of amplifiers 102a, 102b are then produced to duplexers 104a, 104b, respectively and are forwarded to a diplexer 108 for transmission as a CA signal from antenna 110. A single coupler 106 is disposed to pass the outgoing carrier aggregated output of diplexer 108. Coupler 106 produces a feedback signal to a low noise amplifier 114 via an attenuator 218 that produces an amplified feedback signal to the MRx for processing. In the example of FIG. 1, the two couplers were disposed upstream of the inputs of the diplexer. Here, the one coupler is disposed downstream (after) the diplexer.

Figure 2C:
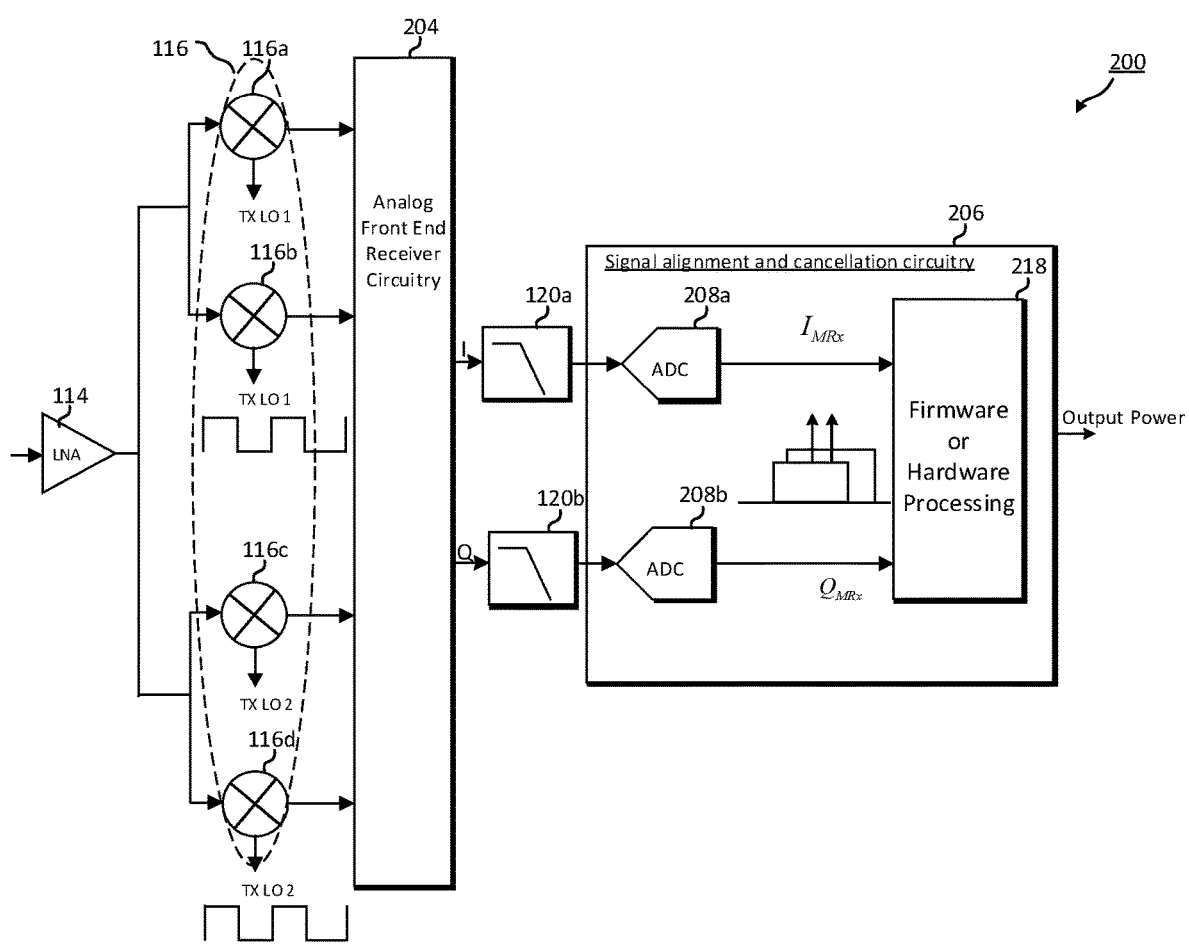
FIG. 2C is a functional block diagram of a measurement receiver connected to two power amplifiers that jointly produce an outgoing carrier aggregated signal according to one embodiment of the disclosure that includes a plurality of mixers.

To continue the analysis of the system of FIG. 2B, the MRx comprises, in sequential order, I and Q mixers 116 that down convert the feedback signal to produce to analog front end circuitry 204. The analog front end receive circuitry 204 includes circuitry for selecting the down converted LO$_1$ and LO$_2$ that corresponds to the desired band (carrier) to be measured. Alternatively, the LO$_1$ and LO$_2$ may be specified by other circuitry such as a processor. It should be noted that "n" TX LO$_n$ signals may be produced to Mixer 116 and the analog front end circuitry 204 can choose anyone of the "n" down converted signals. Alternatively, mixers 116 include mixing circuitry for down converting two different frequencies ("n"=2). For this embodiment, the desired down converted feedback signal is selected from the outputs of the mixing circuitry. One such alternative embodiment is shown in FIG. 2C. The analog front end circuitry 118 selects the desired down converted feedback I and Q signals to filters 120a, 120b that produce ingoing filtered I and Q signals to ADCs 122a, 122b which then produce ingoing digital I and Q components of the feedback signal to hardware 218 for processing. The hardware 218 in FIG. 2B includes logic for digitally eliminating the undesired carrier components from the digital feedback signal received from ADCs 122a, 122b.

FIG. 2C illustrates one embodiment of a mixer 116 (of FIG. 2B) that includes four mixers 116a, 116b, 116c and 116d. As may be seen, TX LO 1 is produced to mixers 116a, 116b and TX LO 2 is produced to mixers 116c and 116d. For each pair of mixers, one mixer down-converts I-Phase signals and the other Q-phase signals.

One advantage of the systems of FIGS. 2A-2C is that only one coupler is needed and a switch is not needed to select between carriers. Accordingly, integrated circuit real estate and hardware costs are reduced. A problem that occurs, however, is that frequency components of a channel of the non-desired carrier may be down converted with the frequency components of the desired carrier channel based on the frequency relationships of the channels/carriers and their associated harmonics. To address this problem, the hardware 204 is constructed to include logic/hardware/circuitry to align the center channel of the down converted channels and signals from both carriers and then to remove the unwanted frequency components to produce an accurate signal representation of the outgoing carrier power level for appropriate transmission power level control. The associated logic/hardware/circuitry of hardware 218 is described in the figures that follow.

Figure 3:
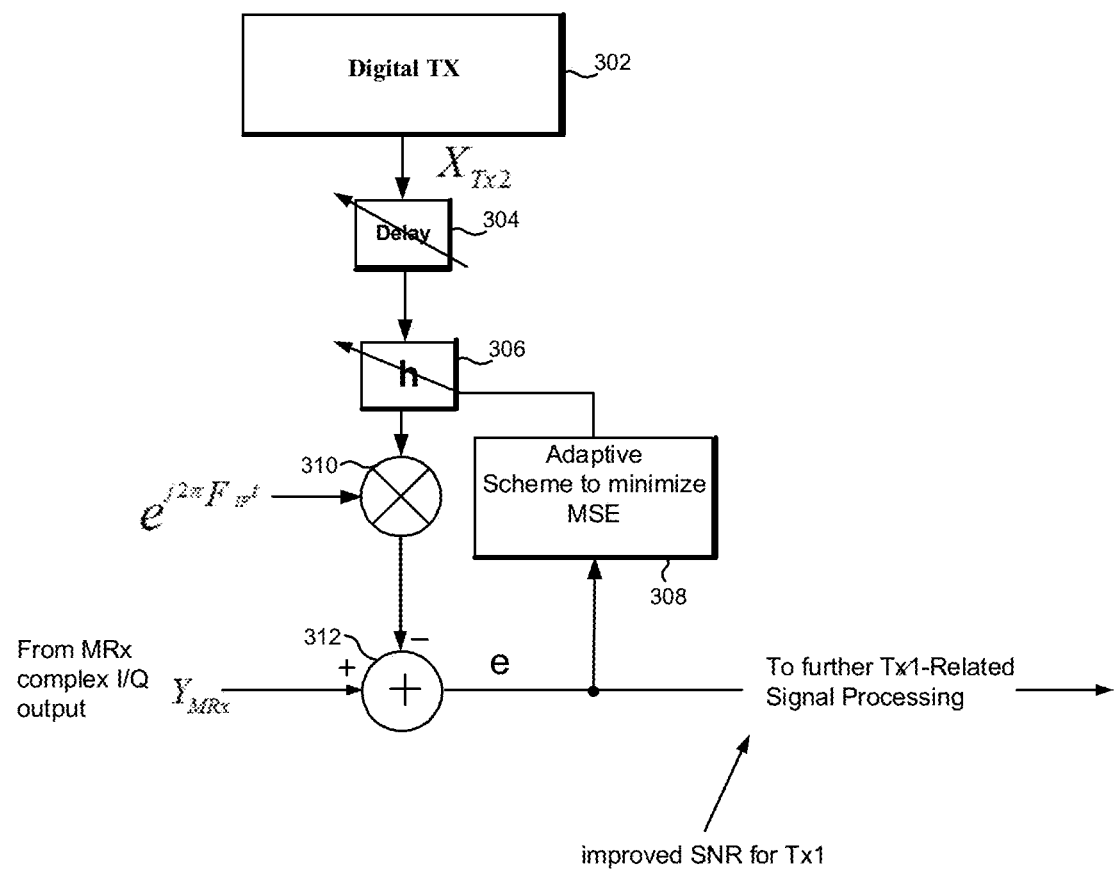
FIG. 3 is a functional block diagram of operational steps performed by circuitry configured to perform pre-processing of the digital feedback signal according to one embodiment of the disclosure.

FIG. 3 is a functional block diagram of operational steps performed by circuitry configured to perform pre-processing of the digital feedback signal according to one embodiment of the disclosure. Generally, FIG. 3 illustrates circuitry and a method for Improving Tx1 SNR by determining optimal filter h for cancelling Tx2 distortion. If one assumes that the two carrier signal bands Tx1 and Tx2 are two different bands for an inter-band CA case with respective $FLO_{Tx1}$ and $FLO_{Tx2}$ channel frequencies that have a N×LO relationship or have a separation on the order of the ADC clock sampling rate $F_{SADC}$ and one further assumes that Tx1 is the CA inter-band that is to be measured, by using knowledge of the transmitted (undesired) Tx2 signal and the received MRx output signal, it is possible to remove the bulk of distortion caused by Tx2.

Thus, a digital TX signal (Tx1 and Tx2) are received by the circuitry at 302 here in FIG. 3. This signal is $Y_{MRX}$. The received inter-band UL CA complex signal by the MRx is:

$$Y_{MRX} = I_{MRX} + jQ_{MRX} \quad (1)$$

Generally, power measurement can be obtained using correlation or $I^2+Q^2$. To remove Tx2, we need to time align the reference (clean) Tx2 signal from Digital Tx block to the Tx2 component of the $Y_{MRX}$ feedback signal (which contains both transmitted components Tx1 and Tx2 with their respective delays). Generally, by implementing a simple delay adjustment for the Tx2 signals to align them with the Tx2 component in the combined inter-band CA MRx signal $Y_{MRX}$ and by using only one complex scaling factor catering specifically to Tx2, Tx2 can be effectively canceled. Thus, the down converted $T_{x2}$ is delayed (plus or minus direction) to be aligned with reference $T_{x2}$ at 304. Because the characteristics of $T_{x1}$ and $T_{x2}$ are known, the phase or timing difference can readily be ascertained to determine the appropriate amount of delay to align $T_{x2}$ and reference $T_{x2}$. By removing the downconverted $T_{x2}$ component of $Y_{MRX}$ signal, we can measure the $T_{x1}$ component more accurately.

The cancelation of the undesired and downconverted Tx2 signal can be done in a variety of ways. The method used to generate the SNR and power measurement improvements is described in more detail next. The signal of equation (1) is a combination of two UL channel signals being transmitted, $X_{TX1}$ and $X_{TX2}$, where the complex reference UL signals $X_{TX1}$ and $X_{TX2}$ are given by:

$$X_{TX1} = I_{TX1} + jQ_{TX1} \quad (2)$$

$$X_{TX2}=I_{TX2}+jQ_{TX2} \quad (3)$$

In the case where there is a harmonic relationship between the inter-band CA frequencies, we have $$FLO_{TX2}=N \times FLO_{TX1}+F_{IF} \quad (4)$$

and in the case where the two UL frequencies have a separation on the order of the ADC clock sampling rate $FS_{ADC}$ $$FLO_{TX2}=FLO_{TX1}+FS_{ADC}+F_{IF} \quad (5)$$

where $F_{IF}$ is some low frequency offset for the case when there is a partial spectrum overlap between the two UL signals after down-conversion. The case when $F_{IF}=0$ corresponds to full overlap of the two UL signals after down-conversion.

If the Tx1 signal is processed when Tx2 signal is several dBs higher in power than Tx1 signal, the resulting SNR for Tx1 will be highly degraded and this in turn will degrade the signal processing performance associated with Tx1 signal. To get a much improved SNR for Tx1, the Tx2 signal is subtracted from $Y_{MRx}$. Thereafter, determining the appropriate weighting factor of the Tx2 signal in the combined received UL CA signal $Y_{MRx}$ allows substantial cancelation of the $T_{X2}$ signal so that a proper measurement may be made of the $T_{X1}$ signal.

There are several methods to determine the optimal weighting of the signal Tx2, most of which aim to minimize the time average of the mean square error (MSE) between the Tx2 and the received signal $Y_{MRx}$, namely, the goal is to minimize:

$$E\{|Y_{MRx}-[h*X_{Tx2}]e^{j2\pi F_{IF}t}|^2\} \quad (6)$$

Where:
h: A generic complex weighting filter
$F_{IF}$: IF frequency separation for the case of partial overlap (as described above). This IF frequency is known since both uplink frequencies are known
$E\{\cdot\}$: Time averaging
*: Convolution operator Referring again to FIG. 3, In the case where h is a multi-tap complex filter, adaptive techniques (e.g. Least Mean Squares) can be used to minimize the MSE described above. Thus, the delayed $X_{TX2}$ signal is produced to complex weighting filter 306 which applies selected weights to the $X_{TX2}$ signal to cancel out the $X_{TX2}$ signal component from the combined received UL CA signal $Y_{MRx}$. The weights are specified in an iterative process through an adaptive scheme to minimize the MSE as reflected by block 308 which produces the weight selections to the generic complex weighting filter 306.

The weighted output of the generic complex weighting filter 306 is produced to a multiplier 310 that multiplies the weighted output with $e^{j2\pi F_{IF}t}$ to produce the multiplied output to summer 312 which sums the multiplied output with $Y_{MRX}$. The summed output of summer 312 is then evaluated by the adaptive scheme of 308 as well as being produced for further $T_{X1}$ related processing. This signal that is produced for further processing has an improved SNR to avoid the problems discussed previously.

Using adaptive schemes, the digital complex filter can be determined in the sampled digital domain. For example, assuming h is a complex N-tap filter, the error "e" in above block diagram at digital sampling instant n can be expressed as $$e(n) = Y_{MRx}(n) - \{\bar{h}^T(n)\bar{X}_{Tx2}(n)\}e^{j2\pi \frac{F_{IF}}{Fs}n} \quad (7)$$

where $F_{IF}$ is non-zero for the partial overlap case and Fs is the digital sampling frequency used for adaptation and $\bar{h}^T(n)$ is the vector transpose of the N-tap complex (filter) vector $$\bar{h}(n)=[h(n)h(n-1) \ldots h(n-N+)] \quad (8)$$

and $\bar{X}_{Tx2}(n)$ is the N-tap Tx2 complex reference signal $$\bar{X}_{Tx2}(n)=[X_{Tx2}(n)X_{Tx2}(n-1) \ldots X_{Tx2}(n-N+1)] \quad (9)$$

The complex filter h(n) is then determined iteratively at each sampling instant "n" using LMS according to $$\bar{h}(n) = \bar{h}(n-1) + 2\mu\{e^{-j2\pi \frac{F_{IF}}{Fs}n}\}e(n)\bar{X}^*_{Tx2}(n) \quad (10)$$

Where μ is the LMS adaption step and (*) in above equation is used to denote the conjugate of the complex vector of the Tx2 reference signal.

With respect to a Cancellation Algorithm that is used in relation to FIG. 3, in its simplest form, a complex scaler (one-tap filter) may be used. In this case, the optimal weighting factor can be computed as $$h = \frac{E\{Y_{MRx}X^*_{Tx2}e^{-j2\pi F_{IF}t}\}}{E\{X_{Tx2}X^*_{Tx2}\}} \quad (11)$$

Figure 4:
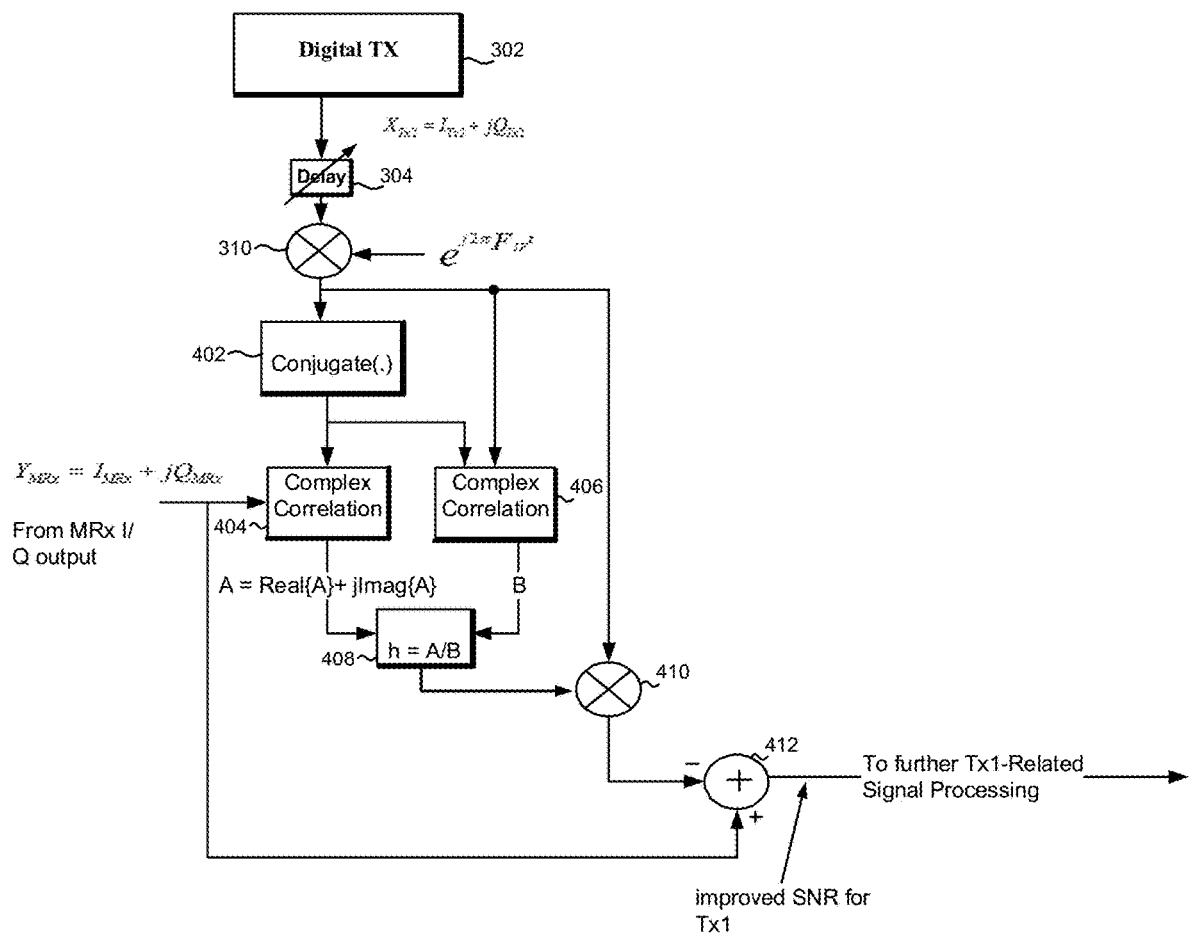
FIG. 4 is a functional block diagram illustrating circuitry and a method for the signal processing for this simple case of the complex scaler.

FIG. 4 is a functional block diagram illustrating circuitry and a method for the signal processing for this simple case of the complex scaler. The delay adjustment is used to time align the Tx2 reference signal and the received MRx signal. The optimal delay setting is the one that maximizes the magnitude of the complex correlation output of the complex correlation block 404 of FIG. 4.

Block 302 represents generation of the digital TX signal and produces a $X_{TX2}$ signal to delay block 304, wherein $$X_{Tx2}=T_{Tx2}+jQ_{Tx2} \quad (12)$$

Which produces a delayed $X_{TX2}$ signal (delayed in + or − directions) to a multiplier 310 that multiplies the delayed $X_{TX2}$ signal output with $e^{j2\pi F_{IF}t}$ to produce a multiplied output to block 402 that generates the conjugate of the multiplied output.

Block 402 then produces the conjugate to complex correlation blocks 404 and 406. Complex correlation block also receives $Y_{MRX}$ as an input for making the complex correlation. Complex correlation block 406 also receives the multiplied output of the delayed $X_{TX2}$ signal from multiplier 310 and for its complex correlation function. The complex correlations can be implemented as shown in block diagrams in FIGS. 5 and 6. The delay setting is the one that maximizes the magnitude of the complex correlation output between $Y_{MRx}$ and $X_{Tx2}$ produced by block 404. The outputs of the blocks 404 and 406 are then produced to block 408 that determines a ratio of the outputs of the blocks 404 to 406 which is then multiplied by multiplier 410 with the output of multiplier 310. The multiplied output of block 410 is then subtracted by subtractor 412 from the $Y_{MRX}$ signal that was also produced to block 404. The output of subtractor 412 is the produced for $T_{X1}$ measurement or other processing.

As one aspect of the disclosure regarding the cancellation, the complex weighting filter can be determined during factory calibration at different frequency points within a band of interest and stored. In another embodiment, however, the filter may be adjusted during operation instead of or in addition to using fixed factory calibrated values. Adjustments during operation will improve the effectiveness of the correction when the operating conditions (temperature, voltage, . . . etc.) change.

As another aspect, since knowledge of the Tx1 and Tx2 signal power levels are well known to the transmitter, the cancellation approach discussed above can optionally be implemented when the Tx2 signal power is high when compared to Tx1 signal power. For example, to ensure a good enough SNR for Tx1 digital pre-distortion, this cancellation can be done if:

$$PTx2 > PTx1 - 5 \text{ dB} \quad (13)$$

The threshold of (13) for when to activate this cancellation scheme is according to one embodiment of the disclosure. Other threshold values may be used.

Figure 5:
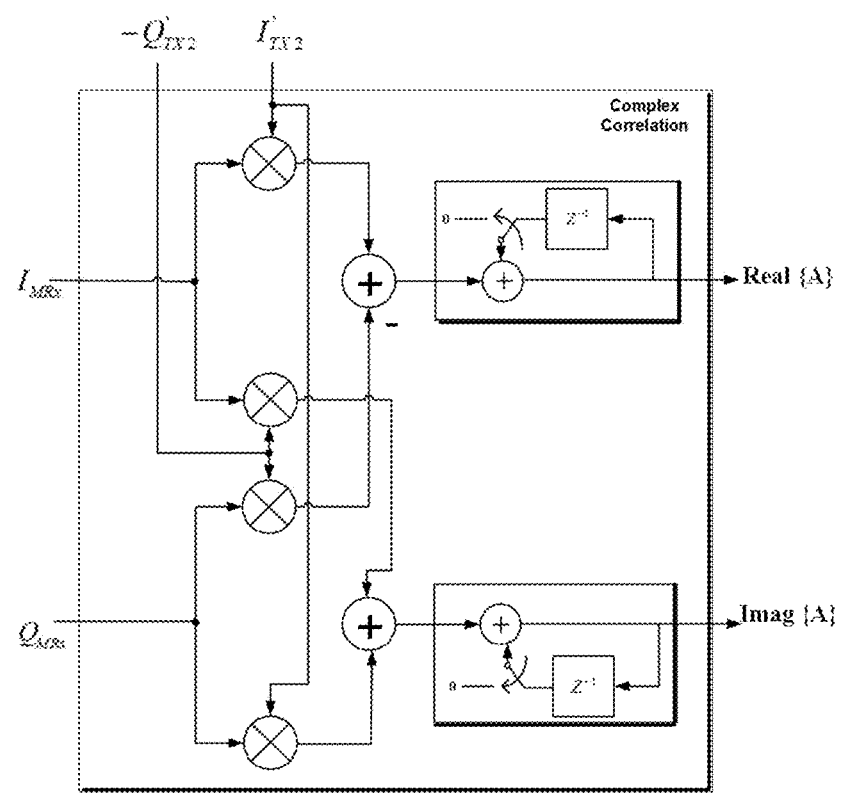
FIG. 5 is a schematic of a circuit that includes a complex correlator that implements the following equations for determining the real and imaginary components of a signal.

FIG. 5 is a schematic of a circuit that includes a complex correlator that implements the following equations for determining the real and imaginary components of a signal. The circuitry implements the following equations:

$$\text{Real}\{A\} = \sum_{n=0}^{N-1} I'_{Tx2}(n) I_{MRx}(n) + Q'_{Tx2}(n) Q_{MRx}(n) \quad (14)$$

$$\text{Imag}\{A\} = \sum_{k=0}^{N-1} I'_{Tx2}(n) Q_{MRx}(n) - Q'_{Tx2}(n) I_{MRx}(n) \quad (15)$$

Figure 6:
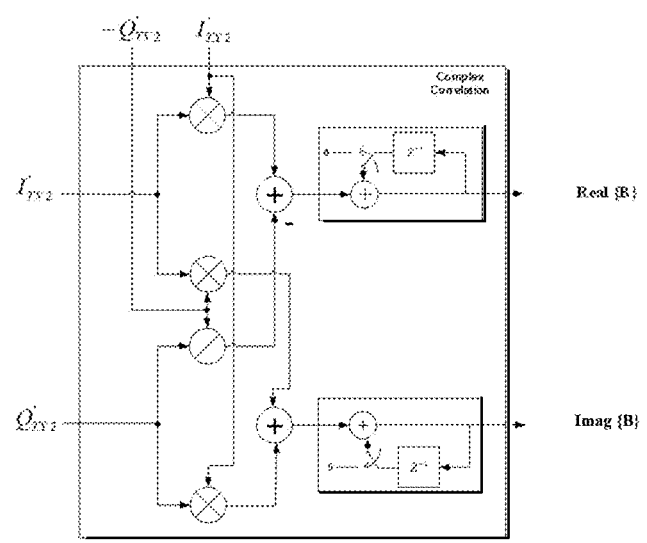
FIG. 6 is a schematic of a circuit that includes a complex correlator that implements the following equations for determining the real and imaginary components of a signal.

FIG. 6 is a schematic of a circuit that includes a complex correlator that implements the following equations for determining the real and imaginary components of a signal. The circuitry implements the following equations:

$$\text{Real}\{B\} = \sum_{n=0}^{N-1} I'^2_{Tx2}(n) \quad (16)$$

$$\text{Imag}\{B\} = \sum_{k=0}^{N-1} Q'^2_{Tx2}(n) \quad (17)$$

Figure 7:
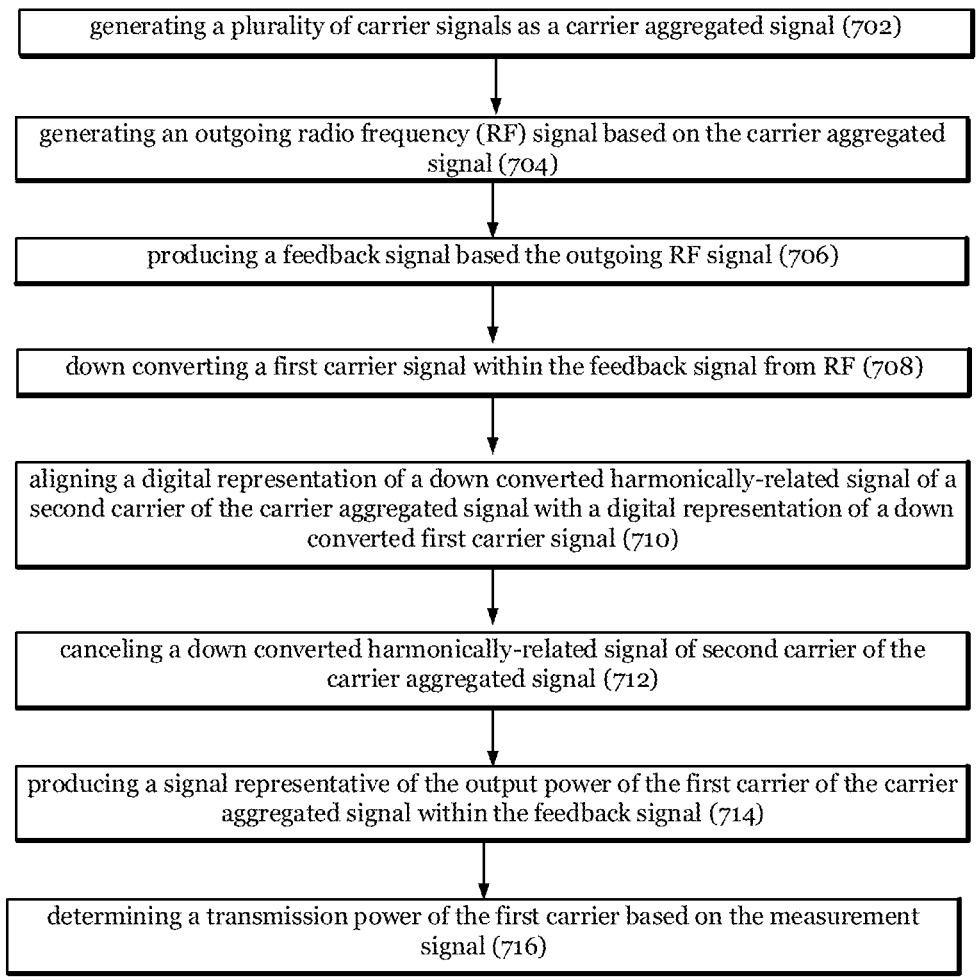
FIG. 7 is a flow chart illustrating a method for transmitting and detecting a transmission power level of a carrier of aggregated carrier signals according to one embodiment of the disclosure.

FIG. 7 is a flow chart illustrating a method for transmitting and detecting a transmission power level of a carrier of aggregated carrier signals according to one embodiment of the disclosure. Initially, the method includes generating a plurality of carrier signals as a carrier aggregated signal (702) and generating an outgoing radio frequency (RF) signal based on the carrier aggregated signal (704). Thereafter, the method includes producing a feedback signal based the outgoing RF signal (706) and processing the feedback signal to obtain a measurement of the transmission power level of the desired carrier. In the described embodiment, the step of producing the feedback signals comprises producing the feedback signal by a single coupler. Processing the feedback signal includes the following steps 708-716.

The first processing step includes down converting a first carrier signal within the feedback signal from RF (708). Thereafter, the method includes time aligning the down converted harmonically-related signal with a digital representation of the down converted harmonically-related carrier signal (710). This harmonically-related carrier signal is the second carrier signal. Time aligning comprises delaying at least one of the digital representations of the second carrier signals so that the two digital representations are aligned in time (phase). Thereafter, the method includes canceling a down converted harmonically-related signal of second carrier of the carrier aggregated signal (712) and producing a signal representative of the output power of the first carrier of the carrier aggregated signal within the feedback signal (714).

The step of canceling a down converted harmonically-related signal of the second carrier of the carrier aggregated signal includes in one embodiment a step of receiving a digital representation of the carrier aggregated signal (YMRx) and to applying weights to components of the reference digital representation of the second carrier signal via a complex filter to match the mean squared error (MSE) of the second carrier signal component present in the combined carrier aggregated received digital signal YMRx. This MSE matching will help provide the best cancellation of this second carrier signal component from the total signal YMRx. Additionally, this cancellation step may include producing a weighted representation of the digital reference Tx to a subtractor that subtracts the weighted representation from the combined carrier aggregated signal to produce a measurement signal. After the measurement signal is produced, the method includes determining a transmission power of the first carrier based on the measurement signal (716).

The prior art requires the use of separate couplers and/or higher order MRx LPF or ADC clock sampling rate for protection from LO harmonics or ADC aliasing. The disclosed embodiments, however, do not require a plurality of separate external couplers/switches or a higher order MRx LPFs or ADC clock sampling rate. Instead, knowledge of the Tx reference signal is used to remove the unwanted impairment to help improve SNR and reduce product area/cost and power consumption.

Figure 8:
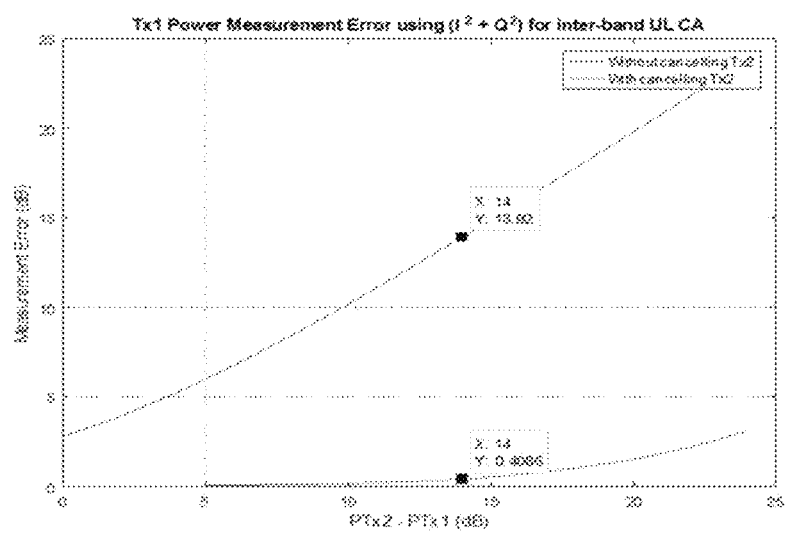
FIG. 8 is a diagram that illustrates different results between applying the methods and circuitry described herein and operation with such application.

FIG. 8 is a diagram that illustrates different results between applying the methods and circuitry described herein and operation with such application. As may be seen, more specifically, FIG. 8 illustrates UL CA power measurement error with and without cancelation as described in this disclosure. As may be seen, the measurement error is over five times greater without the cancelation of the downconverted Tx2 from the multicarrier feedback signal. As described in greater detail previously, a simple delay adjustment and only one complex scaling factor catering specifically to Tx2 is used to effectively cancel Tx2.

Additional embodiments and aspects of the present disclosure may be realized from the following examples.

Example 1. A transceiver capable of transmitting carrier aggregated signals, comprising:

first analog front end transceiver circuitry for producing at least two outgoing radio frequency (RF) signals to power amplification circuitry that produce power amplified outgoing RF signals;

filtering and diplexing circuitry that produce a carrier aggregated RF signal based on the power amplified outgoing RF signals;

a coupler that produces a feedback signal based on carrier aggregated RF signal produced by the filtering and diplexing circuitry; and a measurement receiver coupled to receive and process the feedback signal that comprises the carrier aggregated signal, wherein the measurement receiver further includes:

second analog front end circuitry for down converting a first carrier signal within the carrier aggregated RF signal from RF; and signal cancellation circuitry for aligning a digital representation of a down converted and harmonically-related signal second carrier signal with a digital representation of the second carrier signal and for substantially canceling the down converted harmonically-related signal of second carrier of the carrier aggregated signal.

Example 2. The transceiver of example 1 wherein the signal cancellation circuitry is configured to time align digital reference TX, which comprises a digital representation of the down converted harmonically-related signal, with a digital representation of the down converted first carrier signal.

Example 3. The transceiver of any one of examples 1-2 wherein the signal cancellation circuitry is configured to receive a digital representation of the carrier aggregated signal and to apply weights to components of the digital reference Tx via a complex filter to minimize error introduced by the second carrier signal.

Example 4. The transceiver of any one of examples 1-3 wherein the complex filter produces a weighted representation of the digital reference Tx to a subtractor that subtracts the weighted representation from the combined carrier aggregated signal to produce a measurement signal.

Example 5. The transceiver of any one of examples 1-4 further includes processing circuitry for determining a transmission power of the first carrier based on the measurement signal.

Example 6. The transceiver of any one of examples 1-5 wherein the second analog front end circuitry includes a lower bandwidth ADC than the first analog front end circuitry.

Example 7. The transceiver of any one of examples 1-6 wherein the coupler consists of a single coupler.

Example 8. A measurement receiver for determining transmission power levels of individual carriers of outgoing carrier aggregated signals, comprising:

an input for receiving a feedback signal based on a power amplified outgoing RF signal produced by transceiver circuitry; and analog front end circuitry for down converting a first carrier signal within the feedback signal from RF to one of intermediate frequency or baseband frequency; and signal cancellation circuitry for aligning a down converted and harmonically-related second carrier signal with the first carrier signal and for substantially canceling the down converted harmonically-related second carrier of the carrier aggregated signal.

Example 9. The measurement receiver of example 8 wherein the signal cancellation circuitry is configured to time align a digital representation of the down converted harmonically-related second carrier signal, with a digital representation of the down converted first carrier signal.

Example 10. The measurement receiver of any one of examples 8-9 wherein the signal cancellation circuitry is configured to receive a digital representation of the carrier aggregated signal and to apply weights to components of the digital reference Tx via a complex filter to minimize error introduced by the second carrier signal.

Example 11. The measurement receiver of any one of examples 8-10 wherein the complex filter produces a weighted representation of the digital reference Tx to a subtractor that subtracts the weighted representation from the combined carrier aggregated signal to produce a measurement signal.

Example 12. The measurement receiver of any one of examples 8-11 further includes processing circuitry for determining a transmission power of the first carrier based on the measurement signal.

Example 13. The measurement receiver of any one of examples 8-12 wherein the analog front end circuitry includes a lower bandwidth ADC than analog front end circuitry for an associated receiver.

Example 14. The measurement receiver of any one of examples 8-13 wherein the input is coupled to receive an input signal from a single coupler.

Example 15. A method for transmitting and detecting a transmission power level of a carrier of aggregated carrier signals, comprising:

generating a plurality of carrier signals as a carrier aggregated signal;

generating an outgoing radio frequency (RF) signal based on the carrier aggregated signal;

producing a feedback signal based the outgoing RF signal; and processing the feedback signal by:

down converting a first carrier signal within the feedback signal from RF;

canceling a down converted harmonically-related signal of second carrier of the carrier aggregated signal; and producing a signal representative of the output power of the first carrier of the carrier aggregated signal within the feedback signal.

Example 16. The method of example 15 wherein the step of canceling includes time aligning the down converted harmonically-related signal with a digital representation of the down converted first carrier signal.

Example 17. The method of any one of examples 15-16 further including receiving a digital representation of the carrier aggregated signal and to applying weights to components of the digital representation of the carrier aggregated signal via a complex filter to minimize error introduced by the second carrier signal.

Example 18. The method of any one of examples 15-17 further including producing a weighted representation of the digital reference Tx to a subtractor that subtracts the weighted representation from the combined carrier aggregated signal to produce a measurement signal.

Example 19. The method of any one of examples 15-18 further includes determining a transmission power of the first carrier based on the measurement signal.

Example 20. The method of any one of examples 15-19 wherein producing the feedback signal is performed by a single coupler.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description.

It is therefore intended that the appended claims encompass any such modifications or embodiments.

What is claimed is:

1. A transceiver capable of transmitting carrier aggregated signals, comprising:
   first analog front end circuitry configured to produce at least two outgoing radio frequency (RF) signals to power amplification circuitry that generate at least two power amplified outgoing RF signals;
   filtering and diplexing circuitry configured to produce a carrier aggregated signal based on the at least two power amplified outgoing RF signals;
   a coupler producing a feedback signal based on the carrier aggregated signal produced by the filtering and diplexing circuitry; and
   a measurement receiver receiving and processing, from the coupler, the feedback signal comprising the carrier aggregated signal, wherein the measurement receiver includes:
      circuitry configured to produce at least a first down converted carrier signal and a second down converted carrier signal, wherein the second carrier signal comprises one of:
         a carrier that is harmonically-related to the first carrier signal; or
         an analog-to-digital (ADC) clock separated second carrier signal;
      and
      circuitry configured to time align a digital representation of the down converted first carrier signal and second carrier signal and for canceling the down converted second carrier from the first carrier signal to produce a transmission power measurement signal based on the first carrier signal.

2. The transceiver of claim 1 wherein the circuitry configured to time align includes interference signal cancellation circuitry producing a weighted representation of the digital representation of the second carrier signal to a subtractor that subtracts the weighted representation from the carrier aggregated signal to produce the measurement signal.

3. The transceiver of claim 2 wherein the circuitry configured to time align is further configured to determine transmission power of the first carrier based on the measurement signal.

4. The transceiver of claim 1 wherein the coupler consists of a single coupler.

5. A measurement receiver for determining a transmission power level of a power amplified outgoing signal, comprising:
   an input receiving a feedback signal based on the power amplified outgoing signal produced by transceiver circuitry;
   circuitry configured to produce at least two down converted carrier signals based on the feedback signal, the feedback signal comprising a carrier aggregated signal and including a first and second carrier signals, the second carrier signal comprising one of a carrier that is harmonically-related to the first carrier or an analog-to-digital (ADC) clock separated second carrier signal; and
   circuitry configured to time align a digital representation of the down converted first carrier signal and second carrier signal and to cancel the second carrier from the first carrier to create a transmission power measurement of the first carrier.

6. The measurement reviewer of claim 5 wherein the circuitry configured to time align includes interference signal cancellation circuitry which produces a weighted representation of the digital representation of the second carrier signal to a subtractor that subtracts the weighted representation from the combined carrier aggregated signal to produce a measurement signal.

7. The measurement receiver of claim 6 wherein the circuitry is further configured to determine a transmission power of the first carrier based on the measurement signal.

8. The measurement receiver of claim 5 wherein the input is coupled to receive an input signal from a single coupler.

9. A method for transmitting carrier aggregated carrier signals, comprising:
   generating a plurality of carrier signals as a carrier aggregated signal;
   generating an outgoing radio frequency (RF) signal based on the carrier aggregated signal;
   producing a feedback signal based the outgoing RF signal; and
   processing the feedback signal including the carrier aggregated signal by:
      producing at least two down converted carrier signals based on the feedback signal, comprising a first carrier signal and a second carrier signal wherein the second carrier signal comprises one of;
         a carrier that is harmonically-related to the impaired first carrier; or
         an analog-to-digital (ADC) clock separated second carrier signal;
      time aligning a digital representation of the down converted impaired first carrier signal and second carrier signal;
      canceling the second carrier from the first carrier signal; and
      producing a measurement signal representative of the transmission output power based the first carrier signal.

10. The method of claim 9 further comprising producing a weighted representation of the digital representation of the second carrier to a subtractor that subtracts the weighted representation from the carrier aggregated signal to produce the measurement signal.

11. The method of claim 10 further comprising determining the transmission power of the first carrier based on the measurement signal.

12. The method of claim 9 wherein producing the feedback signal is performed by a single coupler.

* * * * *

UNITED STATES PATENT AND TRADEMARK OFFICE
CERTIFICATE OF CORRECTION

PATENT NO. : 11,251,880 B2
APPLICATION NO. : 16/237578
DATED : February 15, 2022
INVENTOR(S) : Al-Qaq et al.

It is certified that error appears in the above-identified patent and that said Letters Patent is hereby corrected as shown below:

On the Title Page

• Column 2, Line 7 of the Abstract: please replace "process" with --processes--

In the Claims

• Column 13, Line 57 (Claim 5, Line 10): please replace "signals" with --signal--

• Column 14, Line 10 (Claim 6, Line 1): please replace "reviewer" with --receiver--

• Column 14, Line 28 (Claim 9, Line 7): please replace "based the" with --based on the--

• Column 14, Line 46 (Claim 9, Line 25): please replace "based the" with --based on the--

Signed and Sealed this
Twenty-fourth Day of May, 2022

Katherine Kelly Vidal
*Director of the United States Patent and Trademark Office*